United States Patent
Liang (10) Patent No.: US 12,450,425 B2
(45) Date of Patent: Oct. 21, 2025

(54) METHOD AND APPARATUS FOR PROCESSING INFORMATION IN DOCUMENT, AND DEVICE AND MEDIUM

(71) Applicant: Beijing Zitiao Network Technology Co., Ltd., Beijing (CN)

(72) Inventor: Ruiyuan Liang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/397,880

(22) Filed: Dec. 27, 2023

(65) Prior Publication Data

US 2024/0126985 A1    Apr. 18, 2024

Related U.S. Application Data

(63) Continuation of application No. PCT/CN2022/134746, filed on Nov. 28, 2022.

(30) Foreign Application Priority Data

Dec. 2, 2021  (CN) .......................... 202111459871.6

(51) Int. Cl.
  *G06F 40/177*  (2020.01)
  *G06F 16/00*   (2019.01)
  (Continued)

(52) U.S. Cl.
  CPC ............ *G06F 40/177* (2020.01); *G06F 16/93* (2019.01); *G06F 40/106* (2020.01)

(58) Field of Classification Search
  None
  See application file for complete search history.

(56) References Cited

U.S. PATENT DOCUMENTS

| 10,810,361 B1 | 10/2020 | Venkatraman et al. |
| 2004/0133567 A1* | 7/2004 | Witkowski ............ G06F 16/283 |

(Continued)

FOREIGN PATENT DOCUMENTS

| CN | 102436738 A | 5/2012 |
| CN | 107808003 A | 3/2018 |

(Continued)

OTHER PUBLICATIONS

International Search Report in PCT/CN2022/134746, mailed Feb. 20, 2023, 3 pages.

(Continued)

*Primary Examiner* — Mustafa A Amin
(74) *Attorney, Agent, or Firm* — Astute IP Law Group (57) ABSTRACT

The embodiments of the present disclosure relate to a method and apparatus for processing information in a document, and a device and a medium. The method includes: displaying a database table in the document in response to receiving a table creation operation in the document; marking a target area and displaying a comment box on an interface of the document in response to receiving a comment request for the target area in the database table, wherein the target area comprises at least one of: at least one cell row, or at least one cell column; and recording a correlation between comment information and the target area and displaying the comment information in the document in response to receiving the comment information through the comment box, wherein a display position of the comment information in the document is related to a position of the target area in the database table.

20 Claims, 3 Drawing Sheets

(51) Int. Cl.
  *G06F 16/22*    (2019.01)
  *G06F 16/93*    (2019.01)
  *G06F 40/106*   (2020.01)
  *G06F 40/169*   (2020.01)

(56) References Cited

U.S. PATENT DOCUMENTS

| | | | |
|---|---|---|---|
| 2005/0044497 A1* | 2/2005 | Kotler | G06F 40/103 |
| | | | 715/267 |
| 2005/0209989 A1* | 9/2005 | Albornoz | G06F 40/169 |
| 2006/0294455 A1 | 12/2006 | Morris et al. | |
| 2010/0100599 A1* | 4/2010 | Witzany | G06Q 10/107 |
| | | | 709/206 |
| 2014/0281870 A1* | 9/2014 | Vogel | G06F 40/18 |
| | | | 715/220 |
| 2014/0317147 A1 | 10/2014 | Wu | |
| 2016/0132543 A1 | 5/2016 | Bester et al. | |
| 2020/0311191 A1* | 10/2020 | Sekine | G06Q 10/103 |
| 2021/0027007 A1* | 1/2021 | Peng | G06F 40/106 |

FOREIGN PATENT DOCUMENTS

| | | |
|---|---|---|
| CN | 109543154 A | 3/2019 |
| CN | 110019279 A | 7/2019 |
| CN | 110866193 A | 3/2020 |
| CN | 111353272 A | 6/2020 |
| IN | 2111DEL2012 A | 1/2014 |

OTHER PUBLICATIONS

Office Action for Chinese Patent Application No. 202111459871.6, mailed on Feb. 17, 2025, 28 pages.
Notice of Allowance for Chinese Patent Application No. 202111459871.6, mailed on Apr. 29, 2025, 10 pages.

* cited by examiner

METHOD AND APPARATUS FOR PROCESSING INFORMATION IN DOCUMENT, AND DEVICE AND MEDIUM

CROSS-REFERENCE TO RELATED APPLICATIONS

The present application is a continuation of International Application No. PCT/CN2022/134746 filed on Nov. 28, 2022, which claims priority to Chinese Patent Application for invention No. 202111459871.6, filed on Dec. 2, 2021. All the aforementioned patent applications are hereby incorporated by reference in their entireties.

TECHNICAL FIELD

The present disclosure relates to the technical field of computers, and in particular, to a method and an apparatus for processing information in document, and a device and a medium.

BACKGROUND

For most text-editable documents in the prior art, users can not only input text, but also draw tables, such as tables with N rows and M columns, according to requirements, and the tables are only used for simple input and display of data.

SUMMARY

The embodiments of the present disclosure provides a method for processing information in a document, which is applied to a client and comprises: displaying a database table in the document in response to receiving a table creation operation in the document; marking a target area and displaying a comment box on an interface of the document in response to receiving a comment request for the target area in the database table, wherein the target area comprises at least one of: at least one cell row, or at least one cell column; and recording a correlation between comment information and the target area and displaying the comment information in the document in response to receiving the comment information through the comment box, wherein a display position of the comment information in the document is related to a position of the target area in the database table.

In some embodiments, the method further comprises: updating view information of the database table and statistical information of comment information corresponding to the target area based on the comment information.

In some embodiments, the document is an online collaborative document, and the method further comprises: storing the comment information in a server.

In some embodiments, the method further comprises: in a loading stage of the document, requesting the server to acquire all comment information corresponding to the document that is stored and recorded; and rendering comment information based on the all comment information returned by the server and a current visual view of the database table displayed in the document.

In some embodiments, the rendering comment information based on the all comment information returned by the server and a current visual view of the database table displayed in the document comprises: determining target comment information matched with the current visual view from the all comment information returned by the server according to the current visual view of the database table displayed in the document; determining a target area corresponding to the target comment information in the current visual view, and based on a first position of the target area corresponding to the target comment information in the database table, determining a second position of the target comment information displayed in the document; and displaying the target comment information on the second position.

In some embodiments, the method further comprises: marking the target area corresponding to the target comment information by using a designated icon.

In some embodiments, the method further comprises: displaying the target comment information matched with the current visual view in a designated area of the document, and marking the designated area according to a preset manner.

In some embodiments, the method further comprises: displaying at least one of a number of comments or a latest comment time at a target area.

In some embodiments, the marking the target area and displaying the comment box on the interface of the document in response to receiving the comment request for the target area in the database table comprises: highlighting the target area in response to receiving the comment request for the target area in the database table; and updating a current view of the database table, and rendering a temporary comment box, wherein the temporary comment box is used for receiving the comment information input by a user.

In some embodiments, the method further comprises: making the comment box no longer be displayed after receiving the comment information and acquiring a confirmation completion instruction of a user inputting the comment information, or after receiving the comment information for a preset time.

The embodiments of the present disclosure also provides an apparatus for processing information in a document, which is applied to a client and comprises: a table display module configured to display a database table in the document in response to receiving a table creation operation in the document; a comment request module configured to mark a target area and displaying a comment box on an interface of the document in response to receiving a comment request for the target area in the database table, wherein the target area comprises at least one of: at least one cell row, or at least one cell column; a comment display module configured to record a correlation between comment information and the target area and displaying the comment information in the document in response to receiving the comment information through the comment box, wherein a display position of the comment information in the document is related to a position of the target area in the database table.

The embodiments of the present disclosure further provides an electronic device, comprising: a processor; a memory for storing instructions executable by the processor; wherein the processor is used for reading the executable instructions from the memory and executing the instructions to implement the method for processing information in a document provided by the embodiments of the present disclosure.

The embodiments of the present disclosure also provides a non-transitory computer-readable storage medium, which stores a computer program therein for executing the method for processing information in a document provided by the embodiments of the present disclosure.

The embodiments of the present disclosure further provides a computer program, comprising: instructions that when executed by a processor cause the processor to perform the method of processing information in a document provided by the embodiments of the present disclosure.

It should be understood that the statements in this section are not intended to identify key or critical features of the embodiments of the present disclosure, nor are they intended to limit the scope of the present disclosure. Other features of the present disclosure will become apparent from the following description.

BRIEF DESCRIPTION OF THE DRAWINGS

The drawings here are incorporated into the description and form part of the description, showing embodiments consistent with the present disclosure, and are used together with the description to explain the principles of the present disclosure.

In order to more clearly illustrate the technical solutions in the embodiments of the present disclosure or the prior art, a brief introduction will be given below for the drawings required to be used in the description of the embodiments or the prior art. It is obvious that, for an ordinary skilled in the art, he or she may also acquire other drawings according to such drawings without paying inventive efforts.

DETAILED DESCRIPTION

In order that the above objects, features and advantages of the present disclosure may be more clearly understood, the solutions of the present disclosure will be further described below. It is to be noted that, without conflictions, the embodiments and the features in the embodiments of the present disclosure can be combined with each other.

Many details are illustrated hereinbelow to facilitate sufficient understandings on the present disclosure, but the present disclosure may also be implemented by manners different than those as mentioned here. Obviously, the embodiments as described are just a part, instead of all, of the embodiments of the present disclosure.

In documents that can be edited by users, such as Word documents or most online collaborative documents, etc., users may comment on a text or annotate contents in a simply drawn table with N rows and M columns in a document in the form of an annotation box. The inventor found that by accessing a database table to the document, the accessed database table can have database functions of structured storage, SQL (Structured Query Language) Query and operations on data.

Because there is usually a certain commonality in data in a row or data in a column in the database table, users may have a comment requirement for the entire row/column, and at this time, the user requirement cannot be satisfied. In addition, although table contents in EXCEL spreadsheet software can be annotated and commented in the related art, on one hand, it is limited by the format of the EXCEL spreadsheet software, and is far less flexible than inserting database tables in a document (users can also, for example, edit text in other areas of the document besides the tables), and also, for example, users can only make comments on cells in the EXCEL spreadsheet software, and it is difficult to meet the user's requirements for row-level/column-level comments. It should be noted that the above-mentioned defects existing in the related art are also the result of practice and careful research by the applicant, and therefore, the discovery process of the above-mentioned defects and the solution proposed by the embodiments of the present disclosure to the above-mentioned defects in the following should be considered as the applicant's contributions to the present application.

In order to improve or partially improve at least one of the above problems, embodiments of the present disclosure provide a method and an apparatus for processing information in a document, a device, and a medium, which are described in detail below.

Figure 1:
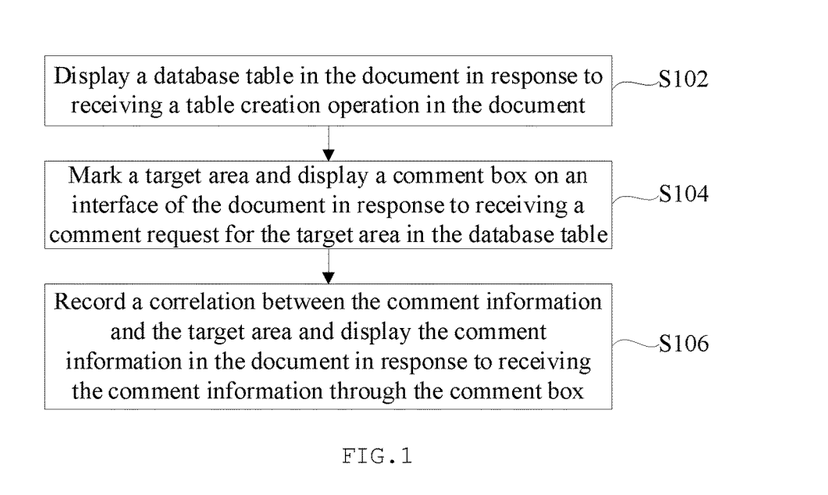
FIG. 1 is a schematic flow diagram of a method for processing information in a document provided by an embodiment of the present disclosure.

FIG. 1 is a flow diagram of a method for processing information in a document provided by an embodiment of the present disclosure, where the method may be applied to a client, and the client may be implemented by at least one of software or hardware, such as a computer, a mobile phone, or other client devices, and may be generally integrated in an electronic device. As shown in FIG. 1, the method mainly comprises the following steps S102 to S106.

In Step S102, a database table is displayed in the document in response to receiving a table creation operation in the document.

In practical applications, a user may perform a table creation operation on a document through a preset table creation component, where the table creation operation is capable of indicating table information of a table to be created, the table information comprises, but is not limited to, setting a format of the table to be M rows and N columns (both M and N are positive integers), or may further comprise a view display form of the table to be created, etc. The embodiments of the present disclosure does not limit the table creation operation. The client may display a database table based on the table creation operation. In the embodiments of the present disclosure, the database table may be accessed into the document, and for example, the database table may be accessed into the document through interactions between a database front end (which may be implemented by a database table application component), a database back end (which may be implemented by a processing program of a database table), a document front end (which may be implemented by a document application program), and a document back end (which may be implemented by a document background processing program), so as to realize a display of the database table in the document. The accessed database table is a structured table having database functions such as structured storage, SQL query and operations on data, and will not be described in detail here. In addition, the documents in the embodiments of the present disclosure are mainly editable documents, such as doc format documents, in which the database table can be accessed and displayed, and text editing can also be performed in other areas other than the database table.

In Step S104, a target area is marked and a comment box is displayed on an interface of the document in response to receiving a comment request for the target area in the database table, wherein the target area comprises at least one of: at least one cell row, or at least one cell column. That is, when the comment request for the target area is received, the target area can be used as an area to be commented of the database table, and the target area is marked in a specified manner and the comment box is displayed. In some embodiments, the comment box may be a temporary box, aiming at receiving the comment information input by a user, and after confirming that the user has finished inputting the comment information, the comment box may no longer be displayed.

In practical application, users access the database table in a document such as a word document or an online collaborative document according to their own needs, and a comment request can be further initiated for a cell row/cell column which needs to be commented in the database table in the document. In some embodiments, the client may be provided with a comment front end component (also referred to as a comment front end, a comment container, or a comment component container) corresponding to the document, and a user may select a target area to be commented through the comment front end component and initiate a comment request corresponding to the target area.

The client can receive the user's comment request for the target area in the database table in the document through the comment front end component, take the target area as an area to be commented on of the database table, and mark the target area according to a specified manner, wherein the specified manner comprises but is not limited to highlighting the target area, or marking the target area by means of arrow pointing and the like.

The client may further display the comment box on the interface of the document through the comment front end component, where the comment box is mainly used to receive the comment information input by the user for the target area, and a display position of the comment box is not limited in the embodiments of the present disclosure. In some examples, the position of the comment box is related to a position of the target area, such as being located near the position of the target area. In some embodiments, the comment box may be set to be no longer displayed on the interface after the comment information input by the user is received and the confirmation completion instruction of the user is acquired (or after a specified time after receiving the comment information).

In Step S106, a correlation between the comment information and the target area is recorded and the comment information is displayed in the document in response to receiving the comment information through the comment box, wherein the display position of the comment information in the document is related to the position of the target area in the database table.

When the user inputs the comment information for the target area through the comment box, the comment information can be associated with the target area, the comment information is determined to be a comment for the target area, and subsequently, the correlation between the comment information and the target area can be further stored in at least one of a local place or a server. Further, the comment information may also be displayed in the document in a specified manner, which may be set according to requirements, for example, the specified manner comprises at least one of displaying the comment information on the right side of the document corresponding to the position of the target area in the database table, or highlighting the comment information in the current document. It is understood that, in order to facilitate the user to view the comment information of the target area, the display position of the comment information in the current document is related to the position of the target area in the database table. For example, in a case where the target area is the fourth row of the database table in the document, the comment information is also located at a position on the right side of the document corresponding to the fourth row of the database table.

Through the above manner, row-level comments/column-level comments on the database table can be realized in the document, and the comment information can be displayed in the document, which effectively improves the information expression ability related to database table in the document. Because data in a row or data in a column in the database table usually have a certain commonality, users may have a comment requirement on the whole row/column, and the above manner also provides convenience for users to comment on row data/column data in the database table in the document.

In order to show the evaluation effect to the user more clearly, in some embodiments, the method provided by the embodiments of the present disclosure further comprises: updating view information of the database table and statistical information of comment information corresponding to the target area based on the comment information. In some specific implementation examples, the view information comprises a view UI (User Interface), and the statistical information of comment information may comprise, for example, a number of comments and/or a latest comment time. Since the database table is newly added with comment information, the view UI of the database table can be updated based on the comment information to change UI effects before and after the comment information, such as setting a yellow triangle mark in the upper right corner of the target area of the database table as the updated view UI of the database table. In addition, one target area may correspond to one or more comments, and if the current document is an online collaborative document, the same target area may correspond to comments of different users, so that at least one of the number of comments or the latest comment time may be marked in the target area, and the number of comments and/or the latest comment time corresponding to the target area may be updated as long as comment information is newly added.

In some embodiments, the document in the embodiments of the present disclosure is an online collaborative document; the method further comprises: storing the comment information in a server end. The server end can be, for example, a server, and further, the server comprises, for example, a comment back end, and the comment information can be stored in the comment back end (which can be implemented by a background program for processing comments and can be set in the server) in the method referred above. The comment back end can provide a service of storing and updating the comment information, that is, can manage the comment information in the background. In addition, the server can further comprise a document back end, a database table back end and the like, and through interactions among the document front end, the document back end, the database table front end, the database table back end, the comment front end and the comment back end, the database table can be accessed into the document and the database table can be commented in the document.

All of the above are embodiments of adding comments to a loaded document. On this basis, the embodiments of the present disclosure further provides a mode of rendering the comment information corresponding to the document when the document is initially loaded, that is, an embodiment of displaying the existing comment information of the document after the document is initially opened. For example, the above method also comprises the following steps a and b.

In Step a, in a loading stage of the document, the server is requested to acquire all comment information corresponding to the document that is stored and recorded. The server can be the comment back end, and because the comment information is sent to the server after new comment information is added to the document every time, the server records all the comments of the document.

Step b, comment information is rendered based on the all comment information returned by the server and a current visual view of the database table displayed in the document. In some implementations, the client may receive all the comment information, but will not display all the comment information on the interface of the current document, but will determine comment information that needs to be displayed for the current visual view of the database table displayed by the current document. For example, the client may only display the comment information corresponding to the current visual view of the database table. It is understood that there may be multiple database tables in the current document, and each database table may also correspond to multiple views, and in the step b, only comment information in the current visual view (the database table view currently visible to the user on the client) is rendered on the database table displayed by the document, so that the user can intuitively see the comment information corresponding to the current visual view of the database table.

In some embodiments, the step b can be performed with reference to the following steps b1 to b3.

In Step b1, target comment information matched with the current visual view is determined from the all comment information returned by the server according to the current visual view of the database table displayed in the document.

In some embodiments, each piece of comment information carries a corresponding database table identifier, and is also associated with the position of the target area of the database table it comments on in the corresponding database table. Therefore, comment information consistent with the table identifier of the database table displayed by the current document can be screened from the all comment information to serve as candidate comment information, and then it is determined whether each piece of the candidate comment information corresponds to the current visual view of the database table displayed by the current document or not, and if yes, the candidate comment information is the target comment information matched with the current visual view.

In Step b2, a target area corresponding to the target comment information in the current visual view is determined, and based on a first position of the target area corresponding to the target comment information in the database table, a second position of the target comment information displayed in the document is determined. In some embodiments, taking a database table row of cells as the target area as an example, a comment list may be created on the right side (or left side) of the document, and then the position of the comment information corresponding to the database table row of cells in the comment list corresponds to the position of the database table row of cells, such as being on the same row. In some embodiments, taking database table column of cells as the target area as an example, a comment list may be created on the upper side (or the lower side) of the database table in the document, and then the position of the comment information corresponding to the database table cell column in the comment list corresponds to the position of the database table column of cells, such as being in the same column.

In Step b3, displaying the target comment information on the second position.

It should be understood that the second position is a position in the document, that is, the comment information for the database table can be directly displayed in the document for the user to view.

On the basis of determining the target comment information, the method further comprises: marking the target area corresponding to the target comment information by using a designated icon. The designated icon may also be understood as a UI represented in a designated form, such as a yellow triangle, a red exclamation mark, an ellipsis, and the like, and the icon form may be set as needed, and is not limited herein. Namely, at the target area corresponding to the target comment information, comments are identified by using a UI represented in a specified form. For example, a designated icon may be set in the upper right corner of the target area to alert the user that comment information exists in the target area.

In order to facilitate the user to view the target comment information as a whole, the method further comprises: displaying the target comment information matched with the current visual view in a designated area of the document, and marking the designated area according to a preset manner. For example, the designated area is the right side of the current document (also the right side of the database table), and the preset manner comprises, but is not limited to, using a comment list box to represent the designated area, using a highlight manner or a preset filling manner to identify the designated area, and the like.

To facilitate understanding, the embodiments of the present disclosure further provides a specific implementation of a method for processing information in a document. In this example, a client comprises a document front end, a database table front end, and a comment front end component; a server comprises a comment back end.

The client and the server realize comment operation through a first interactive mode, wherein in the first interactive mode:

the database table front end is used for, in response to a comment request of a user for a target area in a database table in a current document, taking the target area as an area to be commented on of the database table, and sending the comment request to the document front end and marking the target area according to a specified mode;

the document front end is used for sending a notice of newly added comments to the comment front end component after receiving the comment request;

the comment front end component is used for displaying a comment box (such as rendering a temporary comment box) on an interface of the current document after receiving the notice of the newly added comments, receiving comment information input by a user through the comment box, and sending the comment information to the comment back end for storage;

the database table front end is also used to update view information (such as view UI) corresponding to the comment information and notify the document front end of the position of the target area corresponding to the comment information in the database table.

The document front end is also used for displaying the comment information in a specified manner, the display position of the comment information in the current document is related to the position of the target area in the database table, and the correlation between the comment information and the target area is recorded. The comment front end component can directly send the comment information to the document front end for display after receiving the comment information through a comment box, or the comment back end can return the comment information to the document front end for display after receiving the comment information sent from the comment front end component.

Figure 2:
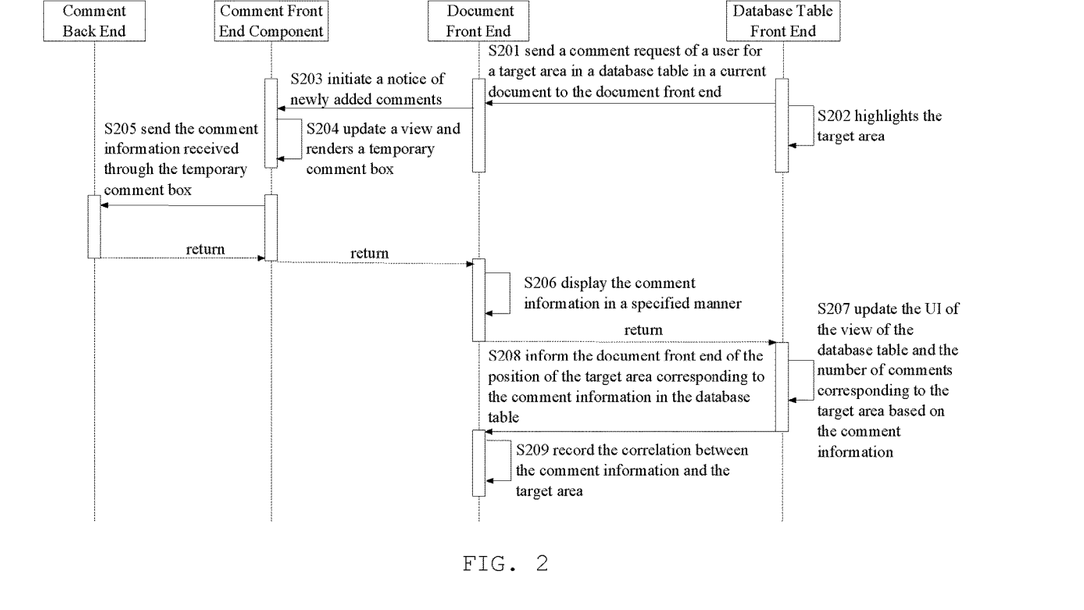
FIG. 2 is an interaction flow diagram of a comment operation provided by an embodiment of the present disclosure.

On the basis of the foregoing, the embodiments of the present disclosure simply adopts an interaction flow diagram of a comment operation as shown in FIG. 2 for exemplary description, which illustrates interaction steps among the document front end, the database table front end, the comment front end component, and the comment back end.

In Step S201, the database table front end sends a comment request of a user for a target area in a database table in a current document to the document front end.

In Step S202, the database table front end highlights the target area. For example, the database table front end takes the target area as an active area, and temporarily highlights the area.

In Step S203, the document front end initiates a notice of newly added comments to the comment front end component.

In Step S204, the comment front end component updates a view and renders a temporary comment box. That is, the comment front end component receives comment information input by the user through the temporary comment box.

In Step S205, the comment front end component sends the comment information received through the temporary comment box to the comment back end. After storing the comment information, the comment back end can return a save operation completion message to the comment front end component, and the comment front end component can also re-render the comment component (so as to indicate to the user that the comment information has been saved) and return a save operation completion message to the document front end.

In Step S206, the document front end displays the comment information in a specified manner, and the display position of the comment information in the current document is related to the position of the target area in the database table. The document front end returns a comment information display completion message to the database table front end. In addition, the document front end can also re-render the comment component to change the display form of the comment component to indicate to the user that the saving operation for comment information has been completed.

In Step S207, the database table front end updates the UI of the view of the database table and the number of comments corresponding to the target area based on the comment information.

In Step S208, the database table front end informs the document front end of the position of the target area corresponding to the comment information in the database table. In addition, the database table front end can further store the comment information and notify the comment back end and the document front end of the information storage completion message.

In Step S209, the document front end records the correlation between the comment information and the target area. Specifically, the correlation records the comment information and the position of the target area corresponding to the comment information in the database table in association.

The above method exemplarily illustrates a comment operation interaction flow among the document front end, the database table front end, the comment front end component, and the comment back end when comments are newly added by users. It should be noted that FIG. 2 is only a simple example illustrating main interaction steps, and should not be considered as a limitation. In actual application, it may also be implemented by adopting more or fewer steps than those shown in FIG. 2. In addition, the specific implementation mode of each step in FIG. 2 may refer to the foregoing related contents, and details are not repeated here.

The client and the server realize the comment operation through the above-mentioned first interactive mode, that is, on the basis that the document has been loaded, the loaded document displays the existing comment information, and new comments are added on this basis, the comment operation can be realized by the interactive mode shown in FIG. 2. Further, the embodiments of the present disclosure also provide a specific mode in which the client and the server realize the rendering operation of the comment information through a second interactive mode at the initial loading stage of the current document, that is, provides a specific mode as how to display the comment information corresponding to the document in the document when the document is initially loaded. In the second interactive mode:

the comment front end component is used for requesting the comment back end for acquiring all stored and recorded comment information corresponding to the current document and returning the all comment information received from the comment back end to the document front end;

the document front end is used for initiating a comment update notice to the database table front end based on the all comment information;

the database table front end is used for determining target comment information matched with a current visual view from the all comment information according to the current visual view of the database table displayed by the current document, and returning the target comment information to the document front end; the database table front end is also used for updating a view UI of the database table;

the document front end is also used for displaying target comment information, and is also used for informing the comment front end component to update the comment UI after displaying the target comment information;

the comment front end component is also used for comment marking at the target area corresponding to the target comment information by using a UI represented in a specified form (that is, mark the target area corresponding to the target comment information using a designated icon).

Figure 3:
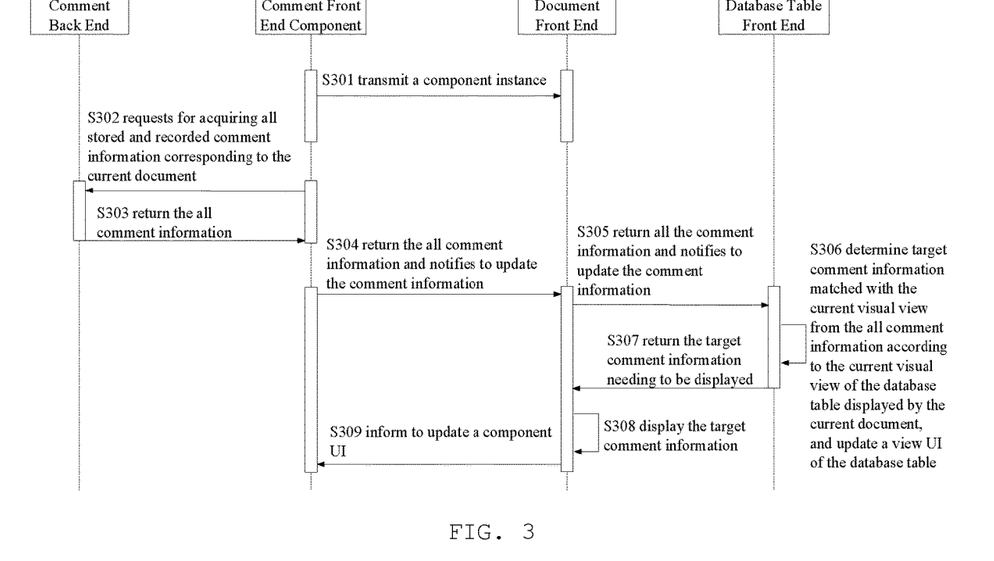
FIG. 3 is an interaction flow diagram of a rendering operation provided by an embodiment of the present disclosure.

On the basis of the foregoing, the embodiments of the present disclosure simply adopts an interaction flow diagram of a rendering operation as shown in FIG. 3 for exemplary description, which illustrates interaction steps among the document front end, the database table front end, the comment front end component, and the comment back end.

In step S301, the comment front end component transmits a component instance to the document front end. In particular, the comment front end component will instantiate a comment component, and the document front end component will instantiate a business component (a component related to the document business). When the current document is loaded for the first time, if there are comments in the document, the comment component will be rendered.

In step S302, the comment front end component requests the comment back end for acquiring all stored and recorded comment information corresponding to the current document.

In step S303, the comment back end returns the all comment information to the comment front end component.

In step S304, the comment front end component returns the all comment information to the document front end and notifies the document front end to update the comment information. In addition, the comment front end component will also render the comment UI.

In step S305, the document front end returns all the comment information to the database table front end and notifies the database table front end to update the comment information.

In step S306, the database table front end determines target comment information matched with the current visual view from the all comment information according to the current visual view of the database table displayed by the current document, and updates a view UI of the database table.

For example, taking comments on a row of cells (row-level comment) as an example, after receiving the all comment information, the database table front end determines, for each piece of comment information, whether the comment information matches with the currently displayed database table, and if the database table identifier carried by the comment information is consistent with an identifier of the currently displayed database table, the comment information matches with the currently displayed database table, otherwise, the comment information is not matched with the currently displayed database table. If there is a match, continue to determine whether there is corresponding comment row information in the current view (or determine whether there is a corresponding visual view row in the comment information). If the current view row exists and is not screened (namely, the current view row is the current visual view row), the updated view UI is displayed, and the position information of the current visual view row in the database table is determined at the same time, or it can be returned to the document front end; if the comment line information does not have a corresponding visual view row, no processing is required. If there is no match, stop rendering the view effect.

In step S307, the database table front end returns the target comment information needing to be displayed to the document front end.

In step S308, the document front end displays the target comment information. Based on the foregoing example of S306, the database table front end may notify the document front end of the position of the visual view row (i.e., the foregoing target area) corresponding to the target comment information in the database table, so that when the document front end displays the target comment information, it may determine the display position of the target comment information based on the position of the visual view row corresponding to the target comment information in the database table.

In step S309, the document front end informs the comment front end component to update a component UI, which may also be referred to as a container UI. For example, after displaying the target comment information, the document front end may inform the comment front end component to change the UI effect, so as to remind the user that the comment information has been rendered in the current document through the component UI, and inform the user of the corresponding position of the comment information in the database table.

The above mode exemplarily illustrates the comment rendering interaction flow among the document front end, the database table front end, the comment front end component, and the comment back end when the document is initially loaded. It should be noted that FIG. 3 is only a simple example illustrating main interaction steps, and should not be considered as a limitation. In actual application, it may also be implemented by adopting more or fewer steps than those shown in FIG. 3. In addition, the specific implementation of each step in FIG. 3 may refer to the foregoing related contents, and details are not repeated here.

In practical application, when a document is initially loaded, a comment information rendering operation may be performed with reference to, for example, FIG. 3, so that existing comment information of the document is rendered and displayed on the document. When a new comment is added in the current document, a comment information adding operation (also referred to as a comment operation) may be performed with reference to FIG. 2.

To sum up, the method for processing information in a document provided by the embodiments of the present disclosure can realize row-level comments/column-level comments on the database table in the document, and display the comment information in the document, which effectively improves the information expression ability related to the database table in the document. Because the row data or the column data in a database table usually have a certain commonality, users may have a comment requirement on the whole row/column, and the above mode also provides convenience for users to comment on row data/column data in the database table in the document.

In addition, the embodiments of the present disclosure focuses on how to comment on at least one cell row or cell column of the accessed database table in a document, and how to render the existing comment information of the document when the document is initially loaded, thus providing a row/column level comment function for the document that can be accessed to the database table. In the related art, although comment can be made on the table, comment can only be made on table contents, but not directly on database tables embedded in the document, and also comment information cannot be displayed in the document. Meanwhile, comments can only be made on the cells in the database table, and the comment information is only displayed at the cells, but row-level or column-level comments cannot be made on the whole cell row/column. Moreover, limited by the format of EXCEL spreadsheet software, the comment mode is far less flexible than that of the database table inserted in the document. Through the embodiments of the present disclosure, a user can directly perform row-level comment or column-level comment on the database table in the document and clearly view the corresponding comment information in the document. And the document can be a doc document, and besides being accessed to the database table, text editing can be performed at other positions of the document, so that richer and more convenient document editing experience can be provided for the user. Furthermore, it should be noted that what is currently available in the doc document in the related art is only to simply draw a table (non-database table) within a document and comment on data within the table by means of annotations, instead of directly commenting on the database table accessed in a document in the embodiments of the present disclosure. Compared with the table simply drawn in the document, the database table in the embodiments of the present disclosure has database related functions, for example, the accessed database table has database functions such as structured storage, SQL query and operations on data, and meanwhile, the document has stronger data management capability. Moreover, the effect of simple annotation on document tables in the related art is far less than the comment effect that can be achieved by commenting on database tables in the embodiments of the present disclosure.

Furthermore, the document in the embodiments of the present disclosure may be an online collaborative document, on this basis, an effect that multiple users comment on a database table in the document may be achieved, and the interactivity of the document table can be enhanced, and multiple users can express their opinions on the row data/column data in the database table, so as to realize interactive discussion.

Figure 4:
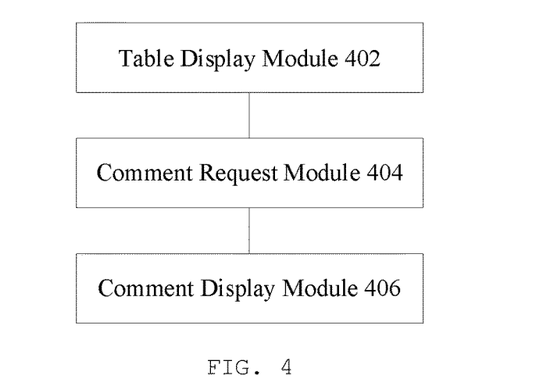
FIG. 4 is a schematic structural diagram of an apparatus for processing information in a document provided by an embodiment of the present disclosure.

Corresponding to the foregoing method for commenting a table in a document, the embodiments of the present disclosure provides an apparatus for processing information in a document. Refer to a schematic structural diagram of an apparatus for processing information in a document shown in FIG. 4, the apparatus may be implemented by software and/or hardware, and may be generally integrated in an electronic device (such as a mobile phone, a computer, etc.) that may serve as a client, comprising:

a table display module 402 configured to display a database table in the document in response to receiving a table creation operation in the document;

a comment request module 404 configured to mark a target area and display a comment box on an interface of the document in response to receiving a comment request for the target area in the database table, wherein the target area comprises at least one of: at least one cell row, or at least one cell column.

a comment display module 406 configured to record a correlation between comment information and the target area and displaying the comment information in the document in response to receiving the comment information through the comment box, wherein a display position of the comment information in the document is related to a position of the target area in the database table.

Through the above apparatus, row-level comments/column-level comments on database tables can be realized in the document, and the comment information is displayed in the document, which effectively improves the information expression ability related to database table in the document. Because the row data or column data in database table usually have a certain commonality, users may have a comment requirement on the whole row/column, and the above mode also provides convenience for users to comment on row data/column data in the database table in the document.

In some embodiments, the apparatus further comprises: an update module configured to update view information of the database table and statistical information of comment information corresponding to the target area based on the comment information.

In some embodiments, the document is an online collaborative document; the apparatus further comprises: a storage module configured to store the comment information in a server.

In some embodiments, the apparatus further comprises: an information acquisition module configured to, in a loading stage of the document, request the server to acquire all comment information corresponding to the document that is stored and recorded; and an information rendering module configured to render comment information based on the all comment information returned by the server and a current visual view of the database table displayed in the document.

The information rendering module is specifically configured to: determine target comment information matched with the current visual view from the all comment information returned by the server according to the current visual view of the database table displayed in the document; determine a target area corresponding to the target comment information in the current visual view, and based on a first position of the target area corresponding to the target comment information in the database table, determining a second position of the target comment information displayed in the document; and display the target comment information on the second position.

In some embodiments, the apparatus further comprises: an icon marking module configured to mark the target area corresponding to the target comment information by using a designated icon.

In some embodiments, the apparatus further comprises: a region marking module configured to display the target comment information matched with the current visual view in a designated area of the document, and mark the designated area according to a preset manner.

In some embodiments, the apparatus further comprises: a comment identification module configured to display at least one of a number of comments or a latest comment time at a target area.

In some embodiments, the comment request module is further configured to: highlight the target area in response to receiving the comment request for the target area in the database table; and update a current view of the database table, and render a temporary comment box, wherein the temporary comment box is used for receiving the comment information input by a user.

In some embodiments, the comment display module is further configured to: make the comment box no longer be displayed after receiving the comment information and acquiring a confirmation completion instruction of a user inputting the comment information, or after receiving the comment information for a preset time.

The apparatus for processing information in a document provided by the embodiments of the present disclosure can execute the method for processing information in a document provided by any embodiments of the present disclosure, and has corresponding functional modules for executing the method and beneficial effects.

It can be clearly understood by those skilled in the art that, for convenience and simplicity of description, the specific working process of the above-described apparatus embodiment may refer to the corresponding process in the method embodiments, and details are not described herein again.

The embodiments of the present disclosure provides an electronic device, which comprises: a processor; a memory for storing instructions executable by the processor; wherein the processor is configured to read the executable instructions from the memory and execute the instructions to implement the method for processing information in a document of any one of the above embodiments.

Figure 5:
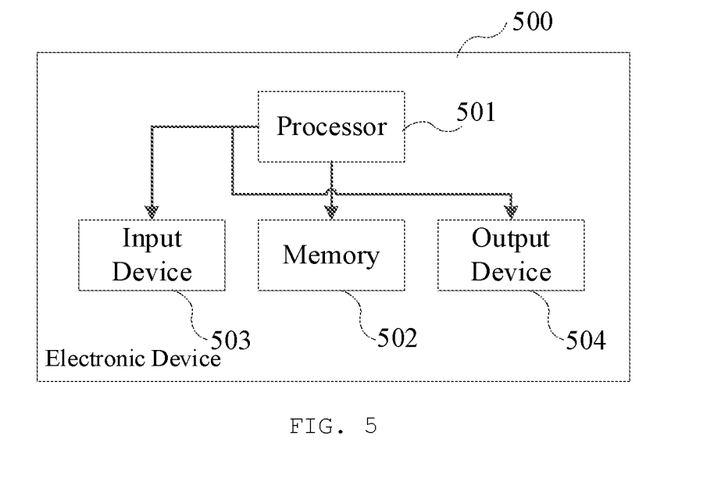
FIG. 5 is a schematic structural diagram of an electronic device provided by an embodiment of the present disclosure.

FIG. 5 is a schematic structural diagram of an electronic device provided by an embodiment of the present disclosure. As shown in FIG. 5, electronic device 500 comprises one or more processors 501 and memory 502.

The processor 501 may be a Central Processing Unit (CPU) or other form of processing unit having data processing capabilities and/or instruction execution capabilities, and may control other components in the electronic device 500 to perform desired functions.

The memory 502 may comprise one or more computer program products, the computer program products may comprise various forms of computer-readable storage media, such as volatile memory and/or non-volatile memory.

The volatile memory may comprise, for example, a Random Access Memory (RAM) and/or a cache, etc. The non-volatile memory may comprise, for example, Read Only Memory (ROM), hard disk, flash memory, etc. One or more computer program instructions may be stored on the computer-readable storage medium, and the processor 501 can execute the program instructions to implement the information processing method and/or other desired functions described above in the embodiments of the present disclosure. Various content such as an input signal, signal components, noise components, etc. may also be stored in the computer-readable storage medium.

In one example, the electronic device 500 may further comprise: an input device 503 and an output device 504, which are interconnected by a bus system and/or other form of connection mechanisms (not shown).

In addition, the input device 503 may also comprise, for example, a keyboard, a mouse, etc.

The output device 504 may output various information to the outside, including the determined distance information, direction information, and the like. The output device 504 may comprise, for example, a display, a speaker, a printer, a communication network and a remote output device connected thereto, etc.

Of course, for simplicity, only some of the components of the electronic device 500 relevant to the present disclosure are shown in FIG. 5, and components such as a bus, an input/output interface, and the like are omitted. Besides, according to the specific application, the electronic device 500 may also comprise any other suitable components.

In addition to the above methods and apparatuses, the embodiments of the present disclosure may also be a computer program product comprising computer program instructions that, when executed by a processor, cause the processor to perform the method for processing information in a document as provided by the embodiments of the present disclosure.

The computer program product may write program code for carrying out operations of embodiments of the present disclosure in any combination of one or more programming languages, the programming languages comprise, but are not limited to an object oriented programming language such as Java, C++ or the like and conventional procedural programming languages, such as the "C" programming language or similar programming languages. The program code may execute entirely on the user computing device, partly on the user device, as a stand-alone software package, partly on the user's computing device and partly on a remote computing device, or entirely on the remote computing device or server.

Furthermore, the embodiments of the present disclosure may also be a non-transitory computer-readable storage medium having stored thereon computer program instructions that, when executed by a processor, cause the processor to perform the method of processing information in a document provided by the embodiment of the present disclosure.

The computer readable storage medium may take any combination of one or more readable media. The readable medium may be a readable signal medium or a readable storage medium. The readable storage medium may comprise, for example, but not limited to, an electronic, magnetic, optical, electromagnetic, infrared, or semiconductor system, apparatus, or device, or any combination of the foregoing. More specific examples (a non-exhaustive list) of the readable storage medium comprise: an electrical connection having one or more wires, a portable diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The embodiments of the present disclosure also provides a computer program product comprising a computer program/instructions, which when executed by a processor, implement a method for processing information in a document in the embodiment of the present disclosure.

It is to be noted that terms used herein to describe relations such as "first" and "second" are only used to distinguish one entity or operation from another, but shall not require or suggest that these entities or operations have such an actual relation or sequence. Furthermore, the term "comprising", "including" or any other variable intends to cover other nonexclusive containing relations to ensure that a process, method, article or apparatus comprising a series of factors comprises not only those factors but also other factors not explicitly listed, or further comprises factors innate to the process, method, article or apparatus. Without more limitations, a factor defined with the sentence "comprising one" does not exclude the case that the process, method, article or apparatus comprising said factor still comprises other identical factors.

The above are only specific embodiments of the present disclosure, which are used to enable those skilled in the art to understand or implement the present disclosure. Various modifications to the disclosed embodiments will be readily apparent to those skilled in the art. The general principles defined herein may be applied to other embodiments without departing from the spirit and scope of the present disclosure. Therefore, the present disclosure will not be limited to these embodiments as shown herein, but is to conform to the broadest scope that is consistent with the principle and novel features as disclosed herein.

What is claimed is:

1. A method for processing information in a document, which is applied to a client, wherein the client comprises a document front end, a database table front end, and a comment front end component, and the method comprises:
    displaying a database table in the document in response to receiving a table creation operation in the document;
    taking, by the database table front end, a target area as an area to be commented on of the database table, and sending, by the database table front end, a comment request to the document front end and marking, by the database table front end, the target area according to a specified mode in response to receiving a comment request for the target area in the database table, wherein the target area comprises at least one of: at least one cell row, or at least one cell column;
    sending, by the document front end, a notice of newly added comments to the comment front end component after receiving the comment request;
    displaying, by the comment front end component, a comment box on an interface of a current document after receiving the notice of the newly added comments, and receiving comment information input by a user through the comment box, and sending the comment information to a comment back end for storage;
    updating, by the database table front end, view information corresponding to the comment information and notify the document front end of a position of the target area corresponding to the comment information in the database table; and recording, by the document front end, a correlation between the comment information and the target area and displaying the comment information in the document in response to receiving the comment information through the comment box, wherein a display position of the comment information in the document is related to the position of the target area in the database table.

2. The method according to claim 1, further comprising: updating the view information of the database table and statistical information of the comment information corresponding to the target area based on the comment information.

3. The method according to claim 1, wherein the document is an online collaborative document, and the method further comprises:
storing the comment information in a server.

4. The method according to claim 3, further comprising:
in a loading stage of the document, requesting the server to acquire all comment information corresponding to the document that is stored and recorded; and
rendering the comment information based on the all comment information returned by the server and a current visual view of the database table displayed in the document.

5. The method according to claim 4, wherein the rendering comment information based on the all comment information returned by the server and a current visual view of the database table displayed in the document comprises:
determining target comment information matched with the current visual view from the all comment information returned by the server according to the current visual view of the database table displayed in the document;
determining the target area corresponding to the target comment information in the current visual view, and based on a first position of the target area corresponding to the target comment information in the database table, determining a second position of the target comment information displayed in the document; and
displaying the target comment information on the second position.

6. The method according to claim 5, further comprising:
marking the target area corresponding to the target comment information by using a designated icon.

7. The method according to claim 5, further comprising:
displaying the target comment information matched with the current visual view in a designated area of the document, and marking the designated area according to a preset manner.

8. The method according to claim 3, further comprising:
displaying at least one of a number of comments or a latest comment time at the target area.

9. The method according to claim 1, wherein the marking the target area and displaying the comment box on the interface of the document in response to receiving the comment request for the target area in the database table comprises:
highlighting the target area in response to receiving the comment request for the target area in the database table; and
updating a current view of the database table, and rendering a temporary comment box, wherein the temporary comment box is used for receiving the comment information input by the user.

10. The method according to claim 1, further comprising:
making the comment box no longer be displayed after receiving the comment information and acquiring a confirmation completion instruction of the user inputting the comment information, or after receiving the comment information for a preset time.

11. An electronic device, characterized in that the electronic device comprises:
a memory for storing instructions executable by a processor; and
the processor configured to read the executable instructions from the memory and execute the instructions to implement a method for processing information in a document which is applied to a client, wherein the client comprises a document front end, a database table front end, and a comment front end component, and the method comprises:
displaying a database table in the document in response to receiving a table creation operation in the document;
taking, by the database table front end, a target area as an area to be commented on of the database table, and sending, by the database table front end, a comment request to the document front end and marking, by the database table front end, the target area according to a specified mode in response to receiving a comment request for the target area in the database table, wherein the target area comprises at least one of: at least one cell row, or at least one cell column;
sending, by the document front end, a notice of newly added comments to the comment front end component after receiving the comment request;
displaying, by the comment front end component, a comment box on an interface of a current document after receiving the notice of the newly added comments, and receiving comment information input by a user through the comment box, and sending the comment information to a comment back end for storage;
updating, by the database table front end, view information corresponding to the comment information and notify the document front end of a position of the target area corresponding to the comment information in the database table; and
recording, by the document front end, a correlation between the comment information and the target area and displaying the comment information in the document in response to receiving the comment information through the comment box, wherein a display position of the comment information in the document is related to the position of the target area in the database table.

12. The electronic device according to claim 11, wherein the processor is further configured to:
update the view information of the database table and statistical information of the comment information corresponding to the target area based on the comment information.

13. The electronic device according to claim 11, wherein the document is an online collaborative document, and the processor is further configured to:
store the comment information in a server.

14. The electronic device according to claim 13, wherein the processor is further configured to:
in a loading stage of the document, request the server to acquire all comment information corresponding to the document that is stored and recorded; and
render the comment information based on the all comment information returned by the server and a current visual view of the database table displayed in the document.

15. The electronic device according to claim 14, wherein the rendering comment information based on the all comment information returned by the server and a current visual view of the database table displayed in the document comprises:
    determining target comment information matched with the current visual view from the all comment information returned by the server according to the current visual view of the database table displayed in the document;
    determining the target area corresponding to the target comment information in the current visual view, and based on a first position of the target area corresponding to the target comment information in the database table, determining a second position of the target comment information displayed in the document; and
    displaying the target comment information on the second position.

16. The electronic device according to claim 15, wherein the processor is further configured to:
    mark the target area corresponding to the target comment information by using a designated icon.

17. The electronic device according to claim 15, wherein the processor is further configured to:
    display the target comment information matched with the current visual view in a designated area of the document, and mark the designated area according to a preset manner.

18. The electronic device according to claim 13, wherein the processor is further configured to:
    display at least one of a number of comments or a latest comment time at the target area.

19. The electronic device according to claim 11, wherein the marking the target area and displaying the comment box on the interface of the document in response to receiving the comment request for the target area in the database table comprises:
    highlighting the target area in response to receiving the comment request for the target area in the database table; and
    updating a current view of the database table, and rendering a temporary comment box, wherein the temporary comment box is used for receiving the comment information input by the user.

20. A non-transitory computer-readable storage medium, wherein the storage medium has stored therein a computer program for performing a method for processing information in a document which is applied to a client, wherein the client comprises a document front end, a database table front end, and a comment front end component, and the method comprises:
    displaying a database table in the document in response to receiving a table creation operation in the document;
    taking, by the database table front end, a target area as an area to be commented on of the database table, and sending, by the database table front end, a comment request to the document front end and marking, by the database table front end, the target area according to a specified mode in response to receiving a comment request for the target area in the database table, wherein the target area comprises at least one of: at least one cell row, or at least one cell column;
    sending, by the document front end, a notice of newly added comments to the comment front end component after receiving the comment request;
    displaying, by the comment front end component, a comment box on an interface of a current document after receiving the notice of the newly added comments, and receiving comment information input by a user through the comment box, and sending the comment information to a comment back end for storage;
    updating, by the database table front end, view information corresponding to the comment information and notify the document front end of a position of the target area corresponding to the comment information in the database table; and
    recording, by the document front end, a correlation between the comment information and the target area and displaying the comment information in the document in response to receiving the comment information through the comment box, wherein a display position of the comment information in the document is related to the position of the target area in the database table.

* * * * *